Jan. 15, 1957     F. G. BOUCHER     2,777,289
FUEL FLOW CONTROL APPARATUS
Filed Aug. 14, 1953
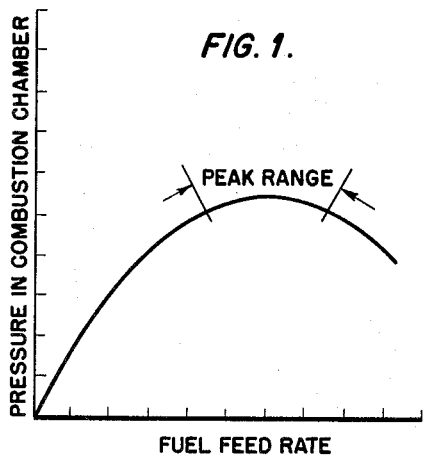
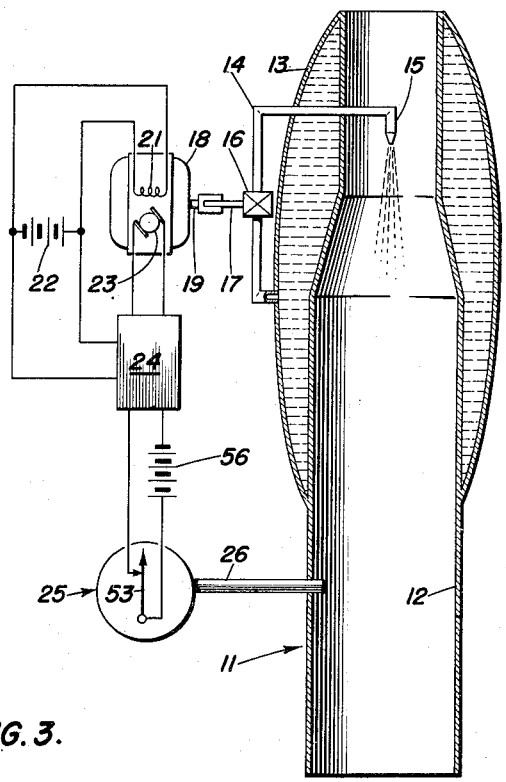
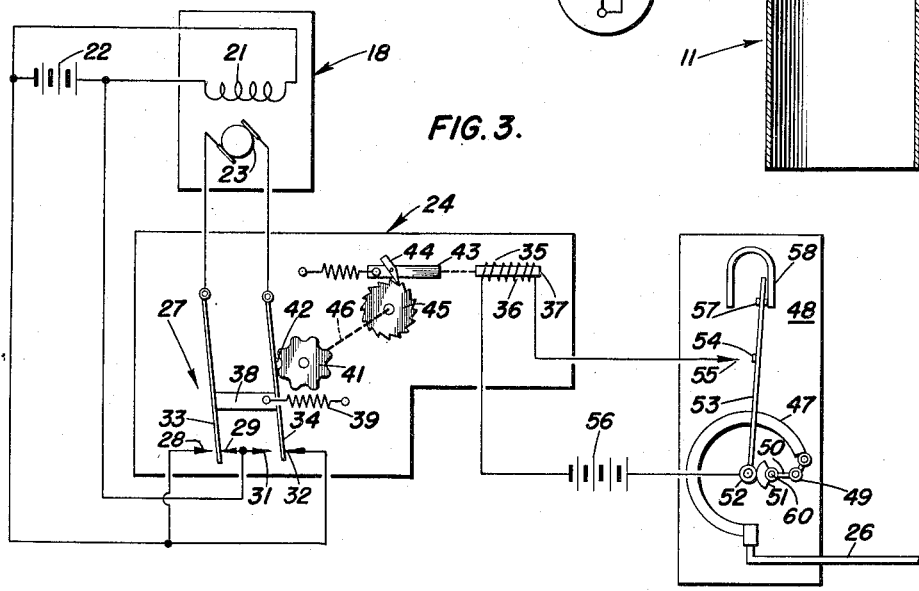
INVENTOR
FRANK G. BOUCHER
BY
ATTORNEYS

United States Patent Office 2,777,289
Patented Jan. 15, 1957

2,777,289

FUEL FLOW CONTROL APPARATUS

Frank G. Boucher, Tulsa, Okla., assignor to the United States of America as represented by the Secretary of the Navy Application August 14, 1953, Serial No. 374,451

5 Claims. (Cl. 60—39.28)

The present invention relates to a fuel flow control apparatus.

More specifically, the invention relates to a process and means for feeding fuel to a ram-jet engine or similar device at a rate which will maintain the pressure produced in the engine's combustion chamber within a defined peak range.

This application is a continuation-in-part of the now abandoned patent application entitled "Fuel Metering System for Guided Missiles" by Frank G. Boucher, Serial Number 107,058, filed on July 27, 1949.

In the operation of a ram-jet engine it is desirable to maintain a continuous constant pressure in the fuel combustion chamber of the engine in order to insure proper operation thereof.

One object of the present invention, therefore, is to provide a means for maintaining the pressure in the fuel combustion chamber of a ram-jet engine substantially constant.

It is a further object of the invention to maintain optimum operating conditions in a fuel combustion chamber by controlling the rate of fuel flow to said chamber in accordance with combustion pressure variations in the chamber.

Other objects and many of the attendant advantages of this invention will be appreciated readily as the same becomes understood by reference to the following detailed description, when considered in connection with the accompanying drawings, wherein:

Fig. 1 is a curve showing the pressure in a fuel-air combustion chamber plotted against the fuel feed rate to the combustion chamber;

Fig. 2 is a functional diagram of a typical embodiment of the invention; and

Fig. 3 is a schematic view showing the arrangement and some of the structural details of the invention.

Referring first to Fig. 1 of the drawings, a plot of the fuel feed rate versus the gas pressure in a combustion chamber is shown. Assuming a constant air supply, it is seen that the gas pressure increases with increasing fuel flow up to a peak value and beyond that point begins to drop off due to the quenching effect of an over-abundance of fuel. A portion of the resulting curve on both sides of the peak value is substantially constant in pressure and is known as the peak range. The apparatus and method utilized to maintain the operation of the combustion chamber within this peak range constitute the present invention and are disclosed more fully in Figs. 2 and 3.

Referring next to Fig. 2, a ram-jet engine 11 having a combustion chamber 12 is shown somewhat diagrammatically as having its fuel supply located in a tank 13 surrounding the forward part of the engine. A fuel conduit 14 leads from the tank 13 to a point within the engine 11, where it terminates in a rearwardly directed nozzle 15, which injects fuel axially downstream into the engine, near the forward end of the combustion chamber 12 thereof. The particular apparatus used to pump the fuel from the tank 13 to the nozzle 15 does not constitute a part of the present invention and has not been disclosed herein. Any conventional pumping system may be employed for this purpose.

A control valve 16 with a valve stem 17 is interposed in the conduit 14 to control the fuel flow to nozzle 15. The valve 16 is of a type which is opened or closed by several turns of the valve stem 17, such as a gate valve or a disk valve, and is to be distinguished from the stop-cock type valve, wherein a quarter turn of the stem is sufficient to place the valve in fully open or fully closed position. The control valve 16 is operated by an electric motor 18.

The electric motor 18 has its shaft 19 alined with the valve stem 17 of valve 16, and is coupled thereto in such way that relative axial shift of the shaft 19 and stem 17 may take place as the two rotate. This permits opening and closing of valve 16 without axial shift of shaft 19. The field winding 21 of motor 18 is permanently connected across a source of direct current power 22 and the armature winding 23 of the motor is connected through a stepping relay 24 to the same source of power.

The stepping relay 24 serves to control the direction of current flow through the armature winding 23; and thus the direction of rotation of the shaft of the motor 18, and is in turn controlled by a pressure actuated switch 25. The switch 25 consists of a pressure responsive element that is in communication with the combustion chamber 12 through a conduit 26, to respond to pressure variations in said chamber, and a single pole switch in a circuit with a source of electric current and the coil windings of the stepping relay 24. The switch 25 derives a mechanical actuation from the pressure variations in the combustion chamber 12 and converts the motion thus derived into an electrical signal which is utilized to control the operation of stepping relay 24. The construction of the stepping relay 24 and pressure responsive switch 25, and their interrelation with the other components of the system, are described more fully hereinafter in the discussion of Fig. 3.

Referring now to Fig. 3, the stepping relay 24 diagrammatically shown therein is of a conventional type including a double-pole, double-throw reversing switch 27 having two pairs of stationary contacts 28, 31, and 29, 32 and two spaced movable contacts 33 and 34 which are operable by a solenoid 35 having a coil 36 and a core 37. The movable contacts 33 and 34 are rigidly interconnected by a strut 38 and, as shown, are urged into engagement with one pair of the stationary contacts 29, 32 by spring means 39. A cam wheel 41 in cooperation with a cam surface 42 connected to one of the movable contacts is adapted to rotate to move said contacts.

A sliding bar 43 connected to the core 37 of the solenoid 35 is spring biased in a direction to withdraw said core from the solenoid coil 36. The bar 43 pivotally mounts a pawl 44 which cooperates with a ratchet wheel 45 mechanically connected at 46 to the cam wheel 41.

It will be noted that upon energization of the solenoid coil 36 the pawl 44 engages the ratchet wheel 45 to rotate said wheel through a predetermined arc. The cam wheel 41 thereupon rotates a corresponding amount. The cam wheel 41 is constructed with one half as many teeth as the number of teeth on the ratchet wheel 45 so that the cam surface 42 alternately engages the addendum and the dedendum of the teeth of the cam wheel. In this manner when the cam surface 42 engages the addendum of the teeth the movable contacts 33 and 34 are in engagement with one pair of stationary contacts 28, 31 respectively. With the cam surface 42 in engagement with the dedendum of the teeth, the movable contacts 33 and 34 engage the other pair of stationary contacts 29, 32, respectively.

Upon de-energization of the solenoid coil 36, the bar 43 moves to withdraw the solenoid core 37 from said coil and resets the pawl 44 with relation to the ratchet wheel 45 to prepare for subsequent turning of said wheel when said coil is reenergized.

One contact from each pair of stationary contacts, for example contacts 28 and 32, is connected to one side of the direct current source 22. The remaining contact of each pair of stationary contacts, for example contacts 29 and 31, is connected to the opposite polarity side of the source 22. The movable contacts 33 and 34 are connected to the armature winding 23 of the motor 18. Thus, it will be seen that upon successive actuations of the movable contacts, the direction of current in the armature winding 23 is alternated, causing the motor 18 to successively reverse its direction of rotation.

The pressure responsive switch 25 comprises a Bourdon tube 47 or an equivalent pressure responsive device, having one end fixed to a rigid support 48 and in communication with the combustion chamber 12 of the ram-jet engine through the conduit 26. The free end of the Bourdon tube 47 is mechanically connected by a pin-jointed linkage 49 including a lever 50 rigidly secured to a drive member 51. Drive member 51 is in the shape of a cylindrical segment pivoted about a stud 60 on the rigid support 48. The drive member 51 frictionally engages a spindle 52 rotatably mounted on the rigid support 48. A switching arm 53 is connected for pivotal motion to the spindle 52.

A contact 54 is carried by the switching arm 53 and is adapted to engage a stationary contact 55 in a series electrical circuit including the relay solenoid coil 36, a source of direct current 56 and said arm. The outer end of the switching arm 53 carries an armature 57 which is disposed between the poles of a permanent magnet 58 suitably mounted on the rigid support 48. The switching arm 53 will thereby be held to either one of the poles of the magnet 58 to prevent chattering of the contacts 54 and 55 until a sufficient torque is applied by the drive member 51 to the spindle 52 to cause said arm to shift to the opposite pole.

Thus, it will be seen that a high pressure in the ram-jet combustion chamber 12 causes the Bourdon tube 47 to straighten, thereby turning the spindle 52 in a clockwise direction to shift the arm 53 in a direction separating the contacts 54 and 55. On the other hand, a low pressure in the chamber 12 brings about a contraction of the Bourdon tube 47 to turn the spindle 52 in a counterclockwise direction and shift the arm 53 in a direction closing the contacts 54 and 55.

Having described the structural features of the invention, the operation thereof is discussed hereinafter.

Initially, it is assumed that the pressure in the combustion chamber 12 is below the peak range on the fuel lean side of the curve shown in Fig. 1. In this instance the motor 18 is turning the valve stem 17 so as to open the valve 16 to admit more fuel into the chamber 12 and thus increase the chamber pressure.

As the chamber pressure increases the Bourdon tube 47 straightens. A predetermined chamber pressure is reached whereupon the straightening of the Bourdon tube 47 is sufficient to overcome the magnetic bias applied by magnet 58 upon the switching arm 53. When this occurs the arm 53 shifts to break the engagement of the contacts 54 and 55 and de-energize the solenoid 36. The sliding bar 43 of the relay 24 is released to reset the pawl 44 and ratchet wheel 45 for subsequent actuation.

For purposes of explanation it will be assumed that when the movable contacts 33 and 34 of the relay switch 27 respectively engage the stationary contacts 29, 32, the motor 18 turns so as to open the valve 16. However, the engagement of these particular contacts to turn the motor 18 so as to close the valve 16 may be accomplished simply by reversing the electrical connections to the armature winding 23 of said motor.

As more fuel is added to the chamber 12 the pressure builds up to a peak as shown in Fig. 1 and then begins to drop off because of the quenching effect of an overabundance of fuel. After the chamber pressure drops a predetermined amount governed by the setting of the pressure responsive switch 25, the Bourdon tube 47 contracts a sufficient amount to close the contacts 54 and 55. The relay solenoid 36 is energized to turn the ratchet wheel 45 and cam wheel 41 to shift the movable contacts 33 and 34 into engagement with the stationary contacts 28, 31 to reverse the motor 18. The valve stem 17 is then turned to close the valve 16 and reduce the amount of fuel being admitted to the chamber 12. Thereafter, the chamber pressure next rises to a peak value and then decreases on the fuel lean side of the curve shown in Fig. 1. Thus, the initial increase in pressure causes the Bourdon tube 47 to act to separate the contacts 54 and 55 and de-energize the solenoid 36. The pawl 44 and ratchet wheel 45 are thereby reset, in the manner described above, for the subsequent turning of the cam wheel 41 to shift the movable contacts 33 and 34 for again reversing the motor 18. This reversal of the motor 18 occurs after the chamber pressure has dropped a predetermined amount and causes more fuel to be admitted to the combustion chamber 12. The pressure then begins to rise and the cycle is repeated.

It will be seen that the system continually oscillates between two predetermined low pressure points respectively on the fuel rich and fuel lean portions of a pressure versus fuel rate curve. The pressure is thereby maintained substantially constant within a desired peak pressure range.

Obviously many other modifications and variations of the present invention are possible in the light of the above teachings. It is therefore to be understood that within the scope of the appended claims the invention may be practiced otherwise than as specifically described.

What is claimed is:

1. A pressure control apparatus for a combustion chamber having a fuel flow control valve, comprising an electric motor to maintain said valve in continuous motion, a stepping relay electrically connected to said motor for altering the direction of motion of said motor upon actuation of said relay, and a pressure responsive switch operable by pressures within the combustion chamber for actuating said relay.

2. A pressure control apparatus for a combustion chamber having a fuel flow control valve, comprising an electric motor for continuously operating said valve, a stepping relay including a solenoid adapted to be energized to actuate said relay, said relay being electrically connected to said motor to change the direction of motion of said motor upon successive actuations of said relay, a source of electrical energy, and a pressure responsive switch operable by pressures within the combustion chamber, said switch being connected in electrical series relation with said solenoid and said source of energy to successively energize and de-energize said solenoid upon pressure fluctuations in the combustion chamber.

3. A pressure control apparatus for a combustion chamber having a fuel flow control valve, comprising an electric motor coupled to said valve for continuously operating said valve, a stepping relay electrically connected to said motor to change the direction of motion of said motor upon actuation of said relay, and a pressure responsive switch including a pressure responsive element operable by pressures within the combustion chamber, said switch being electrically connected to said relay and operable by said element to actuate said relay.

4. A pressure control apparatus for a combustion chamber having a fuel flow control valve, comprising an electric motor coupled to said valve for continuously operating said valve, a stepping relay electrically connected to said motor to change the direction of motion of said motor upon actuation of said relay, a pressure responsive switch including a pressure responsive element operable by pressure within the combustion chamber, said switch being electrically connected t osaid relay and operable by said element to actuate said relay, and means for preventing the chattering of said electric switch.

5. In a combustion pressure control apparatus for a combustion chamber having a fuel flow control valve, the combustion pressure in said chamber normally reaching a peak and then dropping upon increasing the fuel supply to said chamber, an electric switch having a pressure responsive element connected to said combustion chamber and actuable upon a predetermined reduction in combustion pressure below said peak, a first source of electric energy, an electromagnet connected with said first source of energy and said pressure responsive electric switch, a second source of electric energy, a reversing switch having two pairs of stationary contacts connected with inverted polarities to said second source of energy and a pair of movable contacts, said movable contacts being operable by successive energizations of said electromagnet for movement alternately into and out of engagement with the first of said pairs of stationary contacts and simultaneously out of and into engagement with the second of said pairs of stationary contacts, and an electric motor mechanically coupled to said control valve to maintain said control valve in continuous motion, said motor having its armature winding connected to said movable contacts and its field winding connected to said second source of energy so that said alternate movements of said movable contacts by said successive energizations will change the direction of current in the armature winding to change the direction of rotation of the motor for each successive occurrence of said predetermined reduction in combustion pressure below said peak.

References Cited in the file of this patent
UNITED STATES PATENTS

| | | |
|---|---|---|
| 1,931,771 | Pinkerton | Oct. 24, 1933 |
| 2,302,250 | Penn | Nov. 17, 1942 |
| 2,336,052 | Anderson et al. | Dec. 7, 1943 |
| 2,687,009 | Lee | Aug. 24, 1954 |
| 2,687,612 | Anderson et al. | Aug. 31, 1954 |
| 2,688,845 | Ostroff | Sept. 14, 1954 |
| 2,697,327 | Hazen et al. | Dec. 21, 1954 |
| 2,729,061 | Grafinger et al. | Jan. 3, 1956 |